US012538079B2

(12) United States Patent
Nevill et al.

(10) Patent No.: US 12,538,079 B2

(45) Date of Patent: Jan. 27, 2026

(54) MAGNETIC STIFFNESS REDUCTION FOR AUDIO TRANSDUCERS

(71) Applicant: Apple Inc., Cupertino, CA (US)

(72) Inventors: Stuart M. Nevill, Los Gatos, CA (US); Andrew M. Hulva, Gilroy, CA (US); Chanjuan Feng, San Jose, CA (US); Martial A. Rousseau, Saratoga, CA (US); Scott P. Porter, San Jose, CA (US)

(73) Assignee: Apple Inc., Cupertino, CA (US)

( * ) Notice: Subject to any disclaimer, the term of this patent is extended or adjusted under 35 U.S.C. 154(b) by 99 days.

(21) Appl. No.: 18/373,961

(22) Filed: Sep. 27, 2023

(65) Prior Publication Data

US 2025/0106562 A1 Mar. 27, 2025

(51) Int. Cl.

| | |
|---|---|
| ***H04R 9/06*** | (2006.01) |
| ***H04R 7/12*** | (2006.01) |
| ***H04R 9/02*** | (2006.01) |
| ***H04R 9/04*** | (2006.01) |

(52) U.S. Cl.

CPC ............. *H04R 9/025* (2013.01); *H04R 7/127* (2013.01); *H04R 9/046* (2013.01); *H04R 9/06* (2013.01); *H04R 2209/041* (2013.01)

(58) Field of Classification Search

CPC .......... H04R 9/025; H04R 9/046; H04R 9/06; H04R 2209/024; H04R 2209/041

See application file for complete search history.

(56) References Cited

U.S. PATENT DOCUMENTS

| | | | | |
|---|---|---|---|---|
| 4,607,382 | A * | 8/1986 | Dijkstra | H04R 9/06 381/59 |
| 4,609,784 | A * | 9/1986 | Miller | H04R 3/002 381/421 |
| 7,953,240 | B2 | 5/2011 | Matsumura et al. | |
| 9,288,581 | B2 | 3/2016 | Miyata | |
| 11,206,500 | B2 | 12/2021 | Kim et al. | |
| 11,570,547 | B2 | 1/2023 | Silver | |
| 2007/0274556 | A1 * | 11/2007 | Matsumura | H04R 9/025 381/412 |
| 2012/0183170 | A1 | 7/2012 | Chen | |
| 2019/0268690 | A1 | 8/2019 | Singer et al. | |

* cited by examiner

*Primary Examiner* — Huyen D Le

(74) *Attorney, Agent, or Firm* — BAKERHOSTETLER

(57) ABSTRACT

Aspects of the subject technology relate to stiffness reduction for audio transducers, such as speakers. Stiffness reduction can be provided using one or more magnetic structures configured to move with a voice coil and/or a diaphragm of the speaker, and assist in the motion of the voice coil and/or diaphragm via magnetic interaction with one or more magnets of the speaker. In one or more implementations, the one or more magnetic structures may form a tri-stable system with the one or more magnets.

30 Claims, 10 Drawing Sheets

MAGNETIC STIFFNESS REDUCTION FOR AUDIO TRANSDUCERS

TECHNICAL FIELD

The present description relates generally to audio transducers, including, for example, magnetic stiffness reduction for audio transducers.

BACKGROUND

Audio transducers, such as speakers, typically include a front volume and a back volume separated by membrane that is movably suspended by a surround.

BRIEF DESCRIPTION OF THE DRAWINGS

Certain features of the subject technology are set forth in the appended claims. However, for purpose of explanation, several aspects of the subject technology are set forth in the following figures.

DETAILED DESCRIPTION

Figure 1:
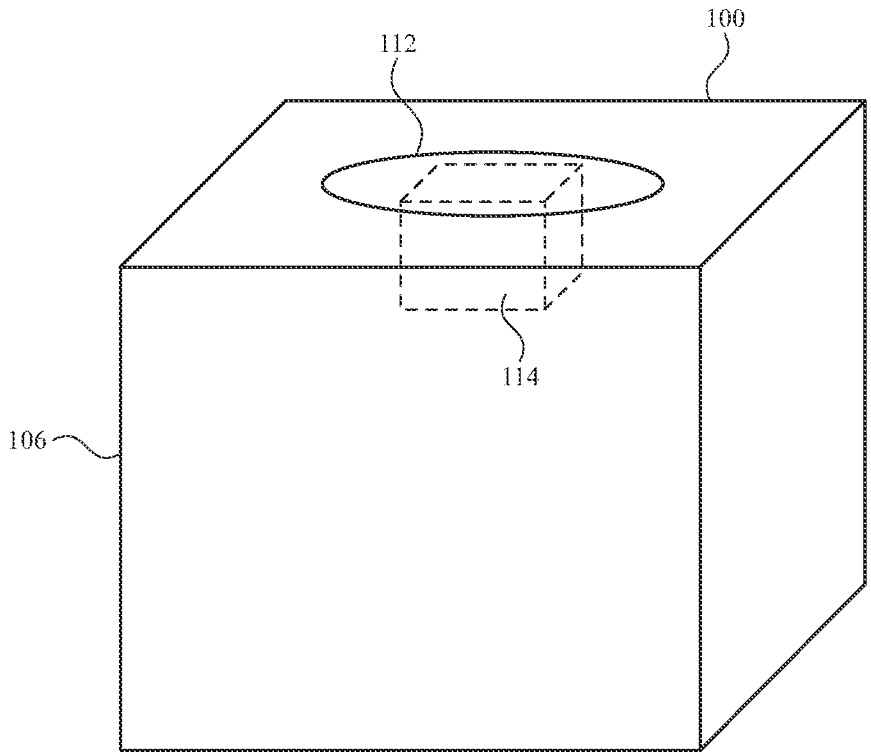
FIG. 1 illustrates a perspective view of an example electronic device having a speaker in accordance with various aspects of the subject technology.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

Electronic devices such as a mobile phones, smartphones, portable music players, tablet computers, laptop computers, wearable devices such as smart watches, headphones, earbuds, other wearable devices, desktop computers, smart speakers, wireless speakers, and the like, often include one or more audio transducers such as a microphone for receiving sound input, and/or a speaker for generating sound. However, challenges can arise in implementing audio transducers, including, for example, into compact electronic devices, in which space may be limited.

For example, a back volume of a speaker having a movable membrane or diaphragm mounted to a voice coil is often a substantially sealed volume. Air within the sealed volume can act as an additional spring (e.g., an air spring) that resists movement of the membrane or diaphragm. This air spring can effectively increase stiffness with which the membrane is moveably suspended. Reducing the size of the back volume can also result in an increase in the stiffness with which the membrane is moveably suspended. Increased stiffness can reduce the ability of the speaker to generate relatively low frequency sounds in some cases.

Aspects of the subject technology can help to reduce the stiffness with which a speaker membrane is moveably suspended, even in implementations in compact devices with small back volumes.

In accordance with aspects of the subject disclosure, stiffness reduction for an audio transducer, such as a speaker, is provided For example, stiffness reduction can be achieved using one or more magnetic structures on, near, or within a voice coil of a speaker. The one or more magnetic structures may interact with a permanent (e.g., fixed) magnet of the speaker to effectively reduce the stiffness with which the membrane is moveably suspended. For example, the magnetic structures may be configured to provide a negative stiffness that effectively cancels a portion of the stiffness generated by the trapped air in the back volume. As discussed in further detail hereinafter, in various implementations, the magnetic structures and the membrane of the speaker may be arranged to form a bi-stable or tri-stable system that provides the negative stiffness.

An illustrative electronic device including an audio transducer, such as a speaker, is shown in FIG. 1. In the example of FIG. 1, electronic device 100 has been implemented using a housing 106. In one or more implementations, the housing 106 may be configured to rest on a table, a shelf, a desk, a counter, or a floor (e.g., electronic device 100 of FIG. 1 may be a smart speaker, a desktop computer, a television, a wireless speaker, a gaming console, or the like). In one or more other implementations, the housing 106 may be sufficiently small to be portable and carried or worn by a user (e.g., electronic device 100 of FIG. 1 may be a handheld electronic device such as a tablet computer, a laptop computer, a portable wireless speaker, a cellular telephone or smartphone, or a wearable device such as a smart watch, a pendant device, a head mountable device, or the like) or.

In the example of FIG. 1, housing 106 includes an opening 112. For example, opening 112 may form a port for an audio component. In the example of FIG. 1, the opening 112 forms a speaker port for a speaker 114 disposed within the housing 106. In this example, the speaker 114 is mounted directly adjacent to the opening 112. In one or more other implementations, the speaker 114 may be offset from the opening 112, and sound from the speaker may be routed to and through the opening 112 by one or more internal device structures.

In various implementations, the housing 106 may also include other openings, such as openings for one or more microphones, one or more pressure sensors, other sensors, one or more light sources, or other components that receive or provide signals from or to the environment external to the housing 106. Openings such as opening 112 may be open ports, or may be completely or partially covered with a permeable membrane or a mesh structure that allows air and/or sound to pass through. Although one opening 112 and one speaker 114 are shown in FIG. 1, this is merely illustrative. One opening 112, two openings 112, or more than two openings 112 may be provided in the housing 106, and/or two or more speakers 114 may be provided within the housing 106. In some implementations, one or more groups of openings in housing 106 may be aligned with a single port of an audio component within housing 106. Housing 106, which may sometimes be referred to as a case, may be formed of plastic, glass, ceramics, fiber composites, metal (e.g., stainless steel, aluminum, etc.), other suitable materials, or a combination of any two or more of these materials.

The configuration of electronic device 100 of FIG. 1 is merely illustrative. In various implementations, electronic device 100 may be a computer such as a computer that is integrated into a display such as a computer monitor, a laptop computer, a media player, a gaming device, a navigation device, a computer monitor, a television, a headphone, an earbud, or other electronic equipment. As discussed herein, in some implementations, electronic device 100 may be provided in the form of a laptop computer or a smart speaker. In one or more implementations, housing 106 may include one or more interfaces for mechanically coupling housing 106 to a strap or other structure for securing housing 106 to a wearer.

In one or more implementations, electronic device 100 may also include a display (not shown) mounted to or within the housing 106. Electronic device 100 may include one or more input/output devices such as a touch screen incorporated into display, a button, a switch, a dial, a crown, and/or other input output components disposed on or behind the housing, the display. Housing 106 and/or a display may include one or more openings to accommodate a button, a speaker, a light source, or a camera (as examples).

Figure 2:
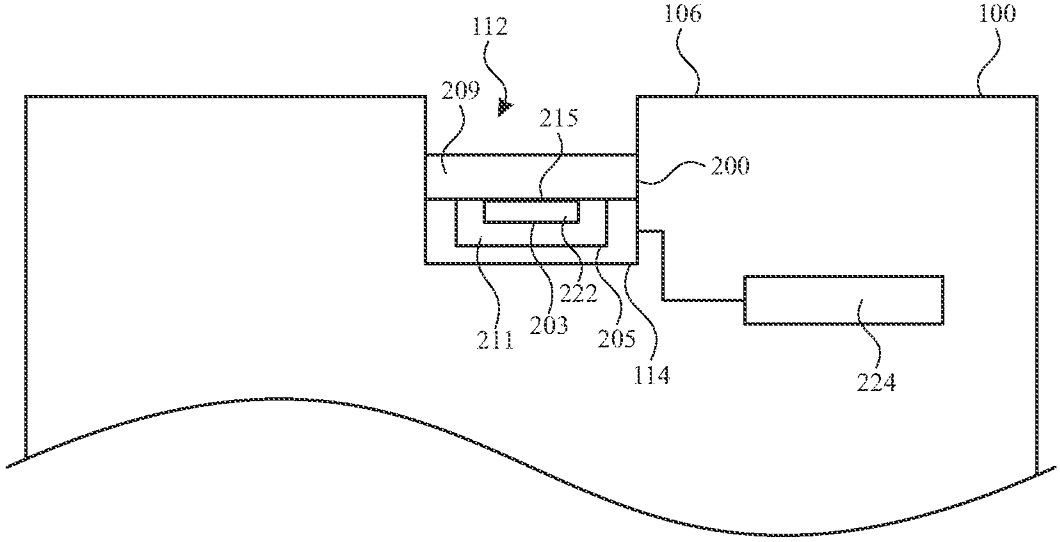
FIG. 2 illustrates a cross-sectional view of a portion of an example electronic device having a speaker in accordance with various aspects of the subject technology.

FIG. 2 illustrates a cross-sectional side view of a portion of the electronic device 100 including a speaker 114. In this example, the speaker 114 may include a front volume 209 and a back volume 211. The front volume 209 and the back volume 211 may be separated by a sound-generating component 215 (e.g., a diaphragm, membrane, or an actuatable component of a microelectromechanical systems (MEMS) speaker). The front volume 209 may be fluidly and acoustically coupled to the opening 112 in the housing 106. The front volume 209 and/or the back volume 211 may be formed, in whole or in part by a speaker housing 200. In the example of FIG. 2, the speaker housing 200 is disposed within the housing 106 of the electronic device 100. In one or more other implementations, the housing 106 may form part or all of the speaker housing for the speaker 114. In one or more implementations, the back volume 211 may be a sealed back volume that is bounded, in part, by the speaker housing 200 and/or the sound-generating component 215.

In the example of FIG. 2, the speaker 114 includes speaker circuitry 222. The speaker circuitry may include, for example, a voice coil 203, a fixed magnet 205, and/or other speaker circuitry. In one or more implementations, the electronic device 100 may also include other circuitry, such as device circuitry 224. Device circuitry 224 may include one or more processors, memory, acoustic components, haptic components, mechanical components, electronic components, or any other suitable components of an electronic device. In one or more implementations, the device circuitry 224 may also include one or more sensors, such as an inertial sensor (e.g., one or more accelerometers, gyroscopes, and/or magnetometers), a heart rate sensor, a blood oxygen sensor, a positioning sensor, a microphone, and/or the like. In one or more implementations, device circuitry 224 may generate, based on audio content to be output by the speaker 114, a current through the voice coil 203. The current through the voice coil 203 may generate variable magnetic field that interacts with the fixed magnet 205 to cause the voice coil 203, and resultingly the sound-generating component 215 to move to generate sound corresponding to the audio content.

Figure 3:
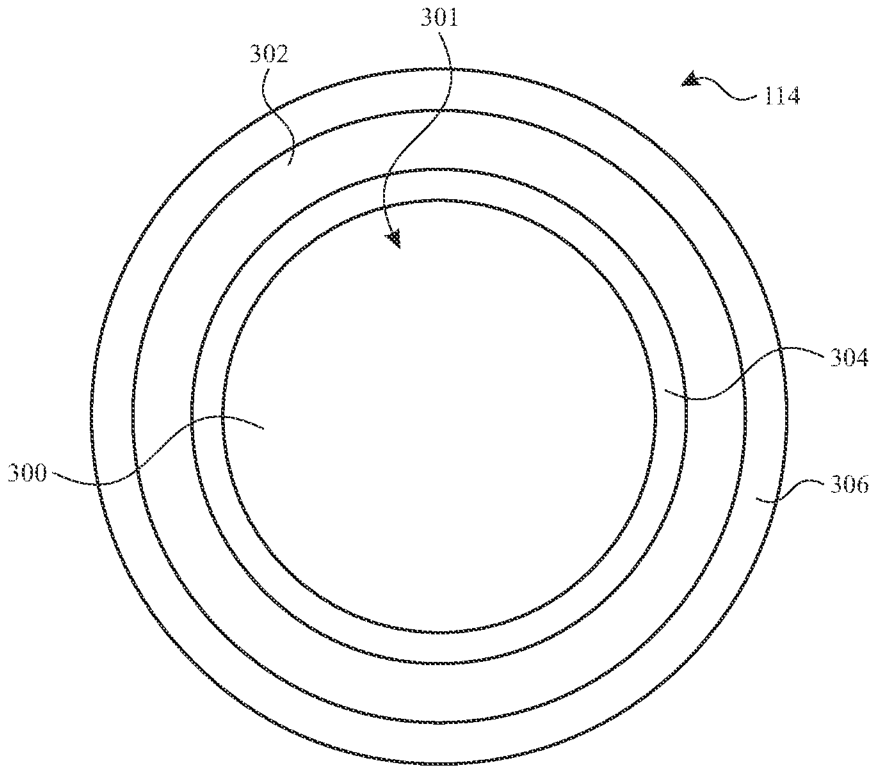
FIG. 3 illustrates a top view of a portion of a speaker in accordance with various aspects of the subject technology.

FIG. 3 illustrates a top view of a speaker assembly for speaker 114, in accordance with one or more implementations. As shown in FIG. 3, the speaker 114 may include a diaphragm 301 (e.g., an implementation of the sound-generating component 215). Speaker 114 may also include a surround 302 that extends around a periphery of diaphragm 301 and that movably suspends the diaphragm 301. In one or more implementations, diaphragm 301 may include a dome portion 300 and a neck portion 304 that extends around a periphery of the dome portion 300. In one or more implementations, the surround 302 may extend from the diaphragm 301 (e.g., from the neck portion 304) to a support structure such as support structure 306. Support structure 306 may be a fixed support structure (e.g., fixed to and/or relative to other portions of the speaker assembly, such as a speaker frame or a speaker housing, and/or fixed to and/or relative to other portions or components of the device in which the speaker is implemented). The surround 302 may be formed from a flexibly resilient material that movably suspends the diaphragm 301 with respect to other components of the speaker, such as a support structure 306 and/or one or more fixed magnets.

Figure 4:
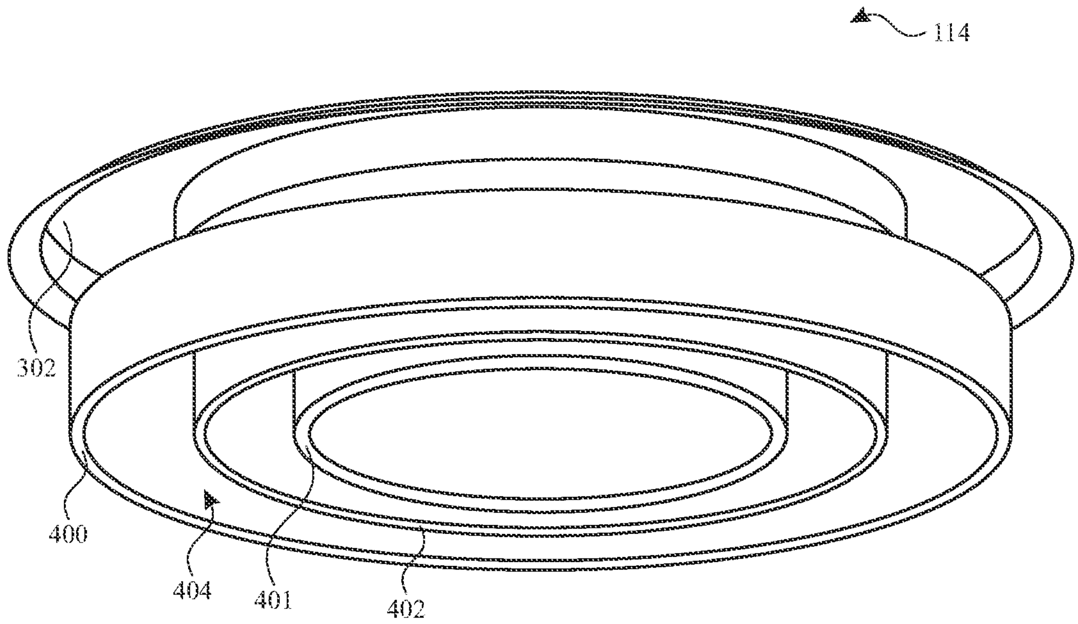
FIG. 4 illustrates a perspective bottom view of a speaker in accordance with various aspects of the subject technology.

FIG. 4 illustrates a bottom perspective view of the speaker 114 in which an underside of the surround 302 of FIG. 3 can be seen. As shown in FIG. 4, the speaker 114 may include a magnet 400 (e.g., a first magnet) and a magnet 401, which may be implementations of the fixed magnet 205 of FIG. 2, and that are separated by a gap 404 within which a voice coil 402 (e.g., an implementation of the voice coil 203 of FIG. 2)

is disposed. In the configuration of FIG. 4, when a current is provided through the voice coil 402, a resulting magnetic field interacts with the magnet 400 and the magnet 401 to move the voice coil 402, and resultingly, the diaphragm 301 that is attached to the voice coil 402. The magnet 400 and the magnet 401 may be two separate magnets, or may be two portions of a single (e.g., contiguous magnet) having a gap 404 between the two portions.

Figure 5A:
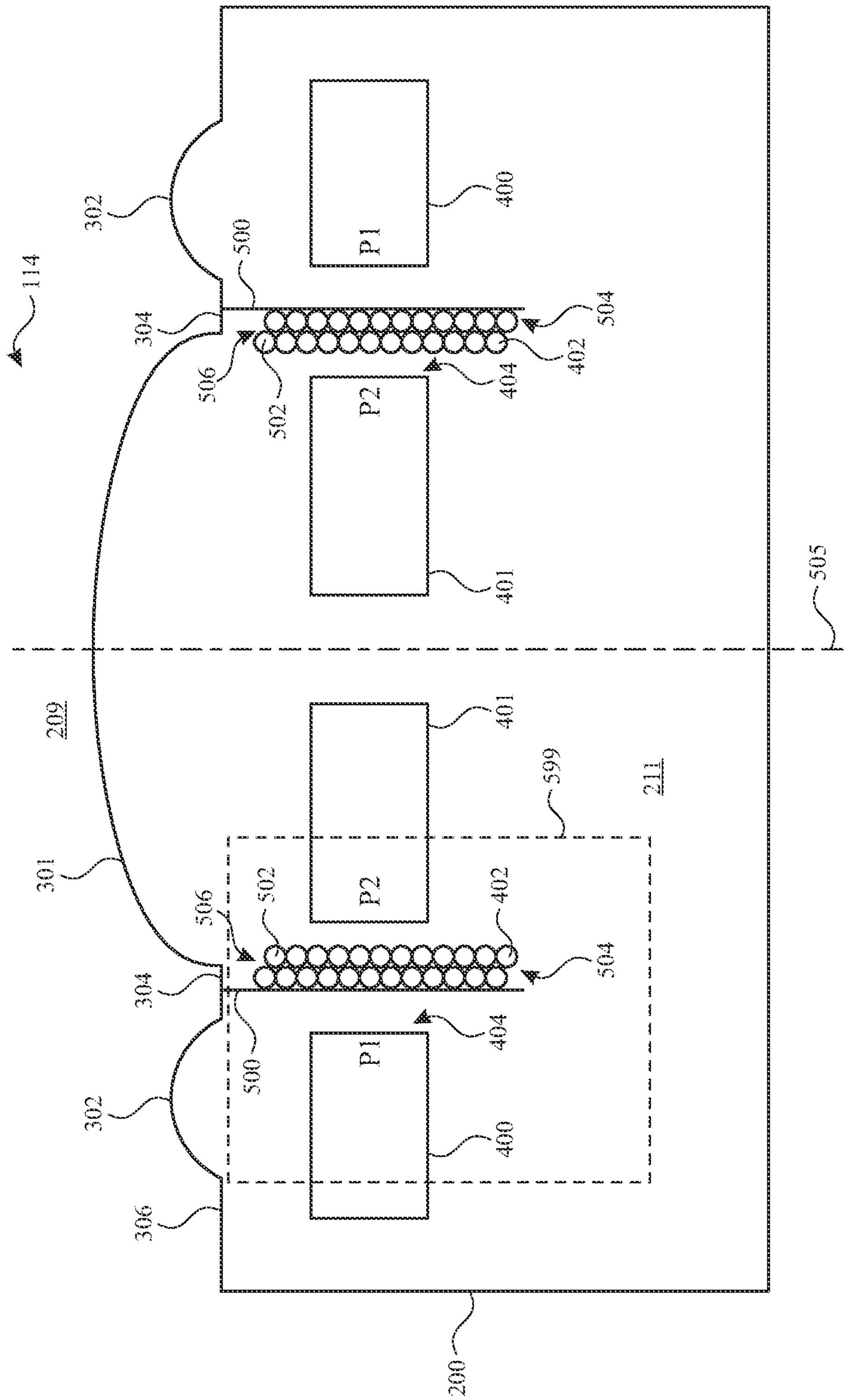
FIG. 5A illustrates a cross-sectional side view of a speaker in accordance with various aspects of the subject technology.

FIG. 5A illustrates a cross-sectional view of the speaker 114 of FIG. 4, in which additional details of the voice coil 402 can be seen. As shown, the voice coil 402 may be formed on (e.g., mounted to) a voice coil former 500, and may be disposed within the gap 404 in the magnet 400. As shown, the voice coil 402 may be formed from a plurality of windings 502 that wind around the magnet 401 that is centered within a bore formed by the voice coil 402. As shown, the voice coil 402 may extend from a first end 504 to a second end 506.

As shown, the magnet 400 may have a first pole external to, facing, and separated from, the voice coil 402, and having a first magnetic polarity P1 (e.g., a North Pole), and the magnet 401 may having a second pole internal to, facing, and separated from, the voice coil 402, and having a second magnetic polarity P2 (e.g., a South Pole) opposite to the first magnetic polarity P1.

As shown in FIG. 5A, the back volume 211 (e.g., as defined by the speaker housing 200 and the diaphragm 301 (e.g., and the surround 302) may be a sealed volume that traps air therewithin. That trapped air may generate an air spring that generates an added stiffness by which the diaphragm 301 is movably mounted by the surround 302. As illustrated by FIG. 4 and FIG. 5A, the speaker 114 may be substantially symmetric about an axis 505.

Figure 5B:
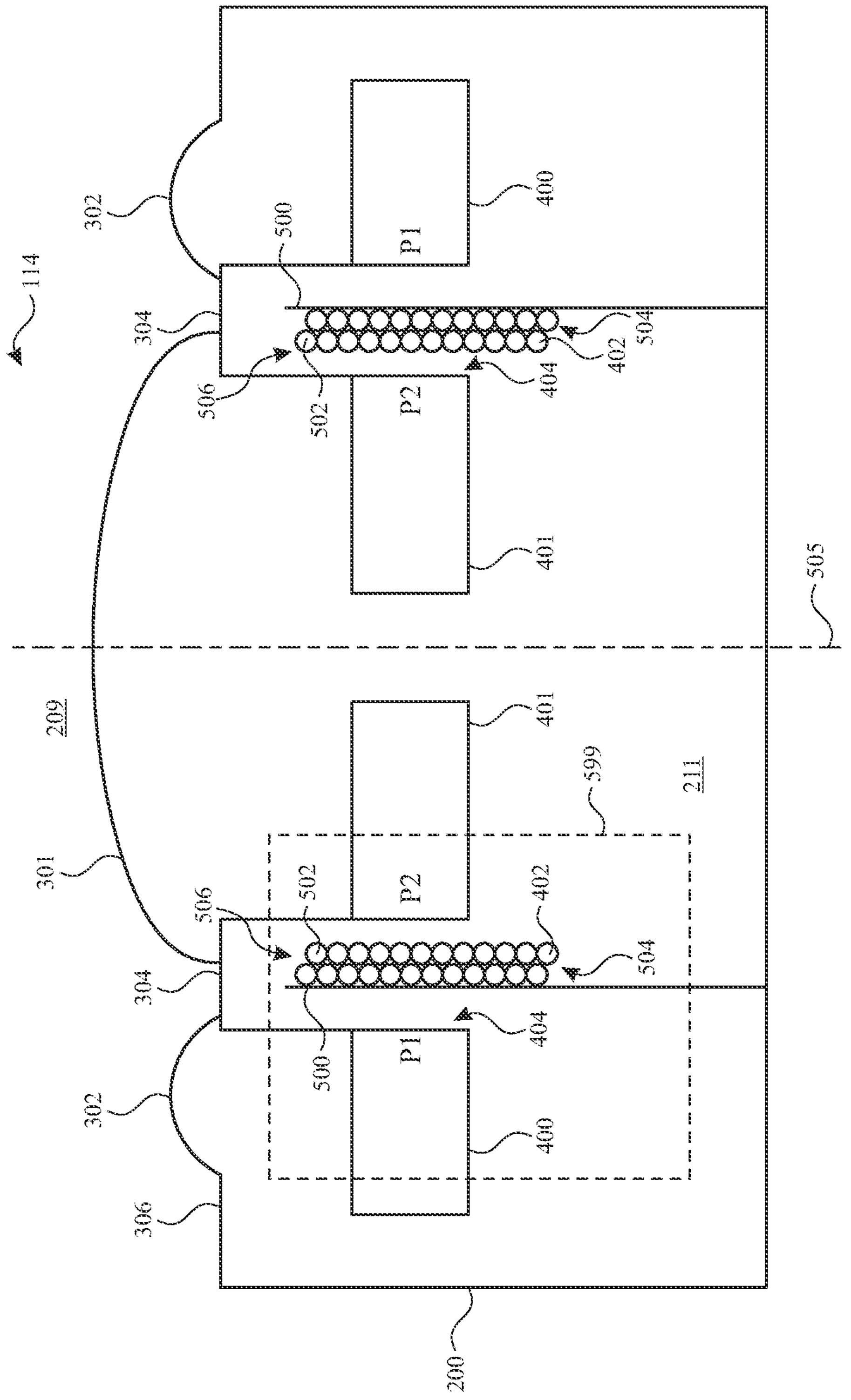
FIG. 5B illustrates another cross-sectional side view of a speaker in accordance with various aspects of the subject technology.

In the example of FIGS. 4 and 5A, the voice coil 402 is movably suspended with respect to the magnet 400 and the magnet 401, which are implemented as fixed magnets (e.g., magnets that are fixed in place relative to the speaker housing 200 and/or the housing 106 of the electronic device 100). However, in one or more other implementations, the magnet 400 and the magnet 401 may be movable magnets and the voice coil 402 may be a fixed voice coil (e.g., voice coil that is fixed in place relative to the speaker housing 200 and/or the housing 106 of the electronic device 100). For example, FIG. 5B illustrates another implementation of the speaker 114 in which the magnet 400 and the magnet 401 are implemented as movable magnets and the voice coil 402 is implemented as a fixed voice coil. As shown in FIG. 5B, the voice coil 402 may be fixed (e.g., to the speaker housing 200 or to another fixed structure of the speaker 114 and/or the electronic device 100), and the magnet 400 and the magnet 401 may be movably suspended relative to the fixed voice coil. In this example, the diaphragm 301 is mechanically coupled to the magnet 400 and the magnet 401. In this configuration of FIG. 5B, when a current is provided through the voice coil 402, a resulting magnetic field interacts with the magnet 400 and the magnet 401 to move the magnet 400 and the magnet 401 (e.g., along a direction parallel to the axis 505), and resultingly, the move diaphragm 301 that is attached to the magnet 400 and the magnet 401. In the example of FIG. 5B, as in the examples of FIGS. 4 and 5A, the speaker 114 may be substantially symmetric about an axis 505.

In accordance with aspects of the subject disclosure, a speaker, such as the speaker 114, may be provided with one or more magnetic structures that reduce the stiffness by which the diaphragm 301 is movably mounted by the surround 302 (e.g., by generating an effective negative stiffness that cancels some or all of the stiffness generated by the trapped air in the back volume 211). Various examples of such magnetic structures are shown in FIGS. 6-12, each of which depicts a portion of the speaker 114 within the dot-dashed box 599 of either of FIG. 5A or FIG. 5B, in various exemplary implementations. For simplicity and clarity, various aspects of the examples of FIGS. 6-12 are described with respect to the implementation of FIGS. 4 and 5A in which the magnet 400 and the magnet 401 are first and second fixed magnets, and the voice coil 402 is movably suspended and configured to move relative to the magnet 400 and the magnet 401 (and to thereby move the diaphragm 301) when a current is passed through the voice coil. However, it is understood that any of the features in examples of FIGS. 6-12 may be implemented in the configuration of FIG. 5B, in which the magnet 400 and the magnet 401 are first and second movable magnets, the voice coil 402 and voice coil former 500 are fixed, and the magnet 400 and the magnet 401 are movably suspended and configured to move relative to the voice coil 402 (and to thereby move the diaphragm 301) when a current is passed through the voice coil.

Figure 6:
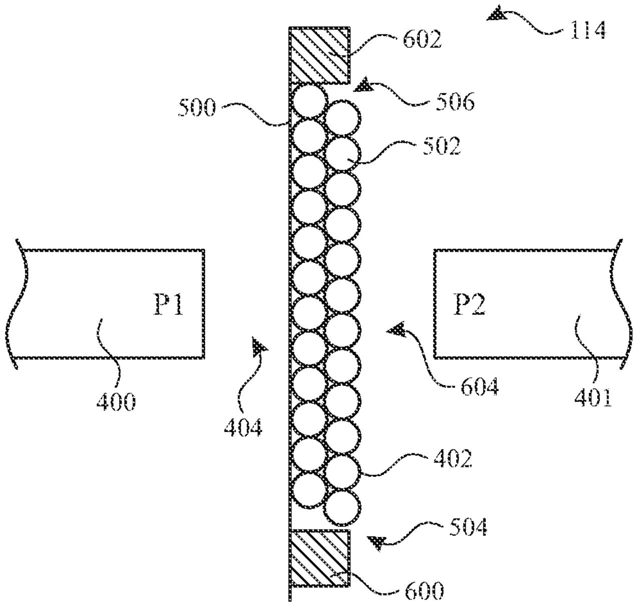
FIG. 6 illustrates a cross-sectional side view of a portion of a speaker in an implementation that includes a voice coil and magnetic structures that form a bi-stable system in accordance with various aspects of the subject technology.

For example, FIG. 6 illustrates a cross-sectional view of the portion of the speaker 114 within the dot-dashed box 599 of FIG. 5A or 5B in an example implementation in which a first magnetic structure 600 is disposed adjacent to the first end 504 of the voice coil 402 and a second magnetic structure 602 is disposed adjacent to the second end 506 of the voice coil 402. As shown, the first magnetic structure 600 and the second magnetic structure 602 may be formed on (e.g., mounted to or attached to) the voice coil former 500, distal to the two ends of the voice coil 402 that is also formed on the voice coil former 500. In this way, the first magnetic structure 600 and the second magnetic structure 602 may be configured to move with the voice coil 402 and the diaphragm 301 responsive to a current provided through the windings 502 of the voice coil 402 (or to remain fixed with the voice coil 402 while diaphragm 301, the magnet 400, and the magnet 401 move relative to the voice coil 402, the first magnetic structure 600, and the second magnetic structure 602).

In the example of FIG. 6, the cross-sectional view shows only one side of the gap 404, and the voice coil 402, the voice coil former 500, the first magnetic structure 600, and the second magnetic structure 602 disposed therein. However, it is appreciated that, as discussed in connection with FIGS. 4, 5A, and 5B, the voice coil 402, the voice coil former 500, the first magnetic structure 600, and the second magnetic structure 602 may be symmetric about the axis 505 shown in FIG. 5A or 5B. For example, the first magnetic structure 600 may be formed from a first ring of magnetic material (e.g., ferromagnetic material, such as steel) attached to the voice coil former 500 at a first location that is adjacent to the first end 504 of the voice coil 402, and the second magnetic structure 602 may be formed from a second ring of magnetic material (e.g., ferromagnetic material, such as steel) attached to the voice coil former at a second location that is adjacent to the second end 506 of the voice coil 402. In various implementations, the first magnetic structure 600 and/or the second magnetic structure 602 may be formed from continuous magnetic rings that extend three-hundred-sixty degrees around the magnet 401, or may be formed from two, three, four, or more than three non-contiguous ring segments or c-shaped ferromagnetic structures that partially extend around the magnet 401 and include one or more gaps between the segments.

In the example of FIG. 6, the first magnetic structure 600 and the second magnetic structure 602 may interact with the magnet 400 and/or the magnet 401 to form a bi-stable system that generates a negative stiffness for the diaphragm 301 (e.g., which may be coupled to the voice coil former 500 as in the example of FIG. 5A, or the magnet 400 or the magnet 401 as in the example of FIG. 5B). This negative stiffness may cancel some or all of the stiffness created by the trapped air in the back volume 211, which resists the motion of the diaphragm 301.

For example, the bi-stable magnetic system of FIG. 6 may be unstable at the center position shown in FIG. 6 (e.g., the position in which the center 604 of the voice coil 402 is centrally positioned between the P1 pole of the magnet 400 and the P2 pole of the magnet 401), and may have two preferred, stable, configurations, at the far ends of the motion (e.g., parallel to the axis 505) that is allowed by the surround 302. For example, in the configuration shown in FIG. 6, both the of first magnetic structure 600 and the second magnetic structure 602 may experience substantially equal and opposite attractions toward the magnets (e.g., the magnet 400 and the magnet 401). For this reason, the magnetic attraction on one of the first magnetic structure 600 and the second magnetic structure 602 increases with reduced distance from the magnets 400 and/or 401 as the magnetic attraction on the other of the first magnetic structure 600 and the second magnetic structure 602 decreases with increased distance from the magnets 400 and/or 401. Thus, any displacement (e.g., caused by a current through the voice coil 402) in one direction (e.g., along the direction parallel to the axis 505) may be assisted by the magnetic interaction between the magnets 400 and/or 401 and the first magnetic structure 600 and the second magnetic structure 602, up until the end of the permitted range of motion. For this reason, the bi-stable configuration of FIG. 6 may at least partially counter any resistance to the motion of the diaphragm 301 that is caused by the trapped air in the back volume 211, and thereby reduce the stiffness of the speaker system.

In one or more implementations, operating the bi-stable system of FIG. 6 may include performing centering operations (e.g., by controlling a current through the voice coil 402, and/or via another centering system or component) to hold the voice coil 402 at the centered position shown in FIG. 6 both in a direction parallel to the axis 505 and a direction perpendicular to the axis 505. However, because these centering operations may consume power and/or utilize additional speaker components, it can be also desirable to be able to provide a speaker having a tri-stable magnetic configuration.

Figure 7:
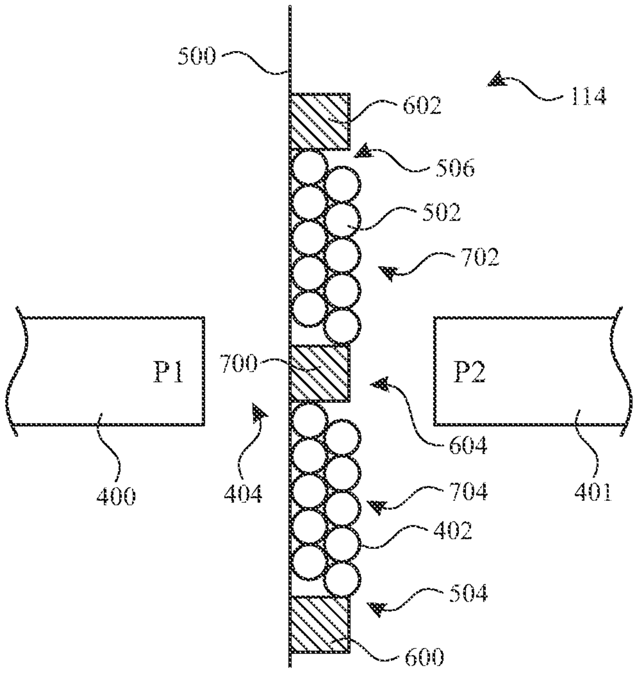
FIG. 7 illustrates a cross-sectional side view of a portion of a speaker in an implementation that includes a voice coil and magnetic structures that form a tri-stable system in accordance with various aspects of the subject technology.

For example, FIG. 7 illustrates an example in which the speaker 114 is implemented with a tri-stable magnetic system. As shown in FIG. 7, the speaker 114 may include the first magnetic structure 600 and the second magnetic structure 602, and may also include a third magnetic structure 700 disposed between the first magnetic structure 600 and the second magnetic structure 602. As shown, the third magnetic structure 700 may also be disposed between first and second portions 702 and 704 of the voice coil 402. For example, the third magnetic structure 700 may be formed on (e.g., mounted to or attached to) the voice coil former 500 at the center 604 of the voice coil 402 (e.g., with equal numbers of windings 502 on each of two opposing sides of the third magnetic structure 700). The first and second portions 702 and 704 of the voice coil 402 may be first and second sets of windings of a single wire, and may form a single contiguous conductive path for current for controlling the sound generation by the speaker 114.

Providing the third magnetic structure as shown in FIG. 7 may form a tri-stable magnetic system with three natural rest positions (e.g., including the centered position shown in FIG. 7, and the two maximum displacement positions described above in connection with FIG. 6). This tri-stable system may provide a natural centering of the voice coil 402 (e.g., in the position illustrated in FIG. 7) with respect to the magnets (e.g., due to the additional attraction of the third magnetic structure 700 to the magnets 400 and/or 401). In this way, the speaker 114 may be operated without performing displacement-centering operations that may be performed with a bi-stable system.

Figure 8:
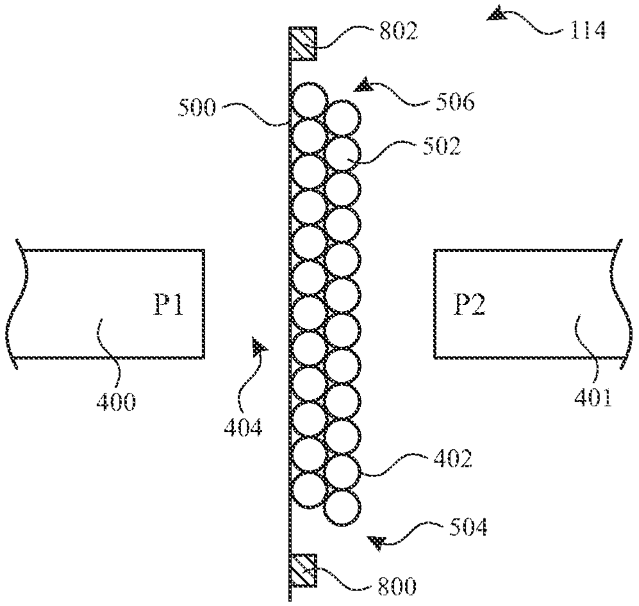
FIG. 8 illustrates a cross-sectional side view of a portion of a speaker in another implementation that includes a voice coil and magnetic structures that form a tri-stable system in accordance with various aspects of the subject technology.

FIG. 8 illustrates another example of a tri-stable system for the speaker 114. In the example of FIG. 8, the tri-stable system is provided without including a third magnetic structure at the center of the voice coil (e.g., as in FIG. 7). In the example of FIG. 8, a first magnetic structure 800 is disposed at or near a first end of the voice coil former 500 (e.g., beyond the first end 504 of the voice coil 402) and a second magnetic structure 802 is disposed at or near a second end of the voice coil former 500 (e.g., beyond the second end 506 of the voice coil 402). As shown, the first magnetic structure 800 and the second magnetic structure 802 may be formed on (e.g., mounted to or attached to) the voice coil former 500, distal to the two respective ends of the voice coil 402 that is also formed on the voice coil former 500. In this example, the first magnetic structure 800 and the second magnetic structure 802 may be smaller and/or less magnetic than the first magnetic structure 600 and the second magnetic structure 602 of the bi-stable system of FIG. 6.

By providing smaller, less magnetic, and/or further-from-center magnetic structures than those shown in FIG. 6, the effect (on the motion of the voice coil 402, the voice coil former 500, and the diaphragm 301) of the first magnetic structure 800 and the second magnetic structure 802 may be negligible for small displacements from center of the voice coil 402 (e.g., relative to the magnets 400 and/or 401), the voice coil former 500, and the diaphragm 301. Accordingly, the speaker 114 in the implementation of FIG. 8 may be stable at the center position shown in FIG. 8. In this configuration, the effect of the first magnetic structure 800 and the second magnetic structure 802, and their interaction with the magnets 400 and 401, may begin to substantially assist in the motion of the voice coil 402, the voice coil former 500, and the diaphragm 301 only for larger displacements from center of the voice coil 402, the voice coil former 500, and the diaphragm 301 (e.g., once one of the first magnetic structure 800 and the second magnetic structure 802 moves to within a threshold distance of the magnet 400 and/or the magnet 401. In this way, the system of FIG. 8 may include a first stable position at the center of the motion parallel to the axis 505, a second stable position at a first far end of the motion allowed by the surround 302 (e.g., when the first magnetic structure 800 is at its nearest position to the magnets 400 and/or 401, and the second magnetic structure 802 is at is furthest position from the magnets 400 and/or 401, whether due to the motion of the voice coil 402 and the voice coil former 500 as in the configuration of FIG. 5A, or due to the motion of the magnets 400 and/or 401 as in the configuration of FIG. 5B), and a third stable position at a second, opposite, far end of the motion allowed by the surround 302 (e.g., when the first magnetic structure 800 is at its furthest position from the magnets 400 and/or 401, and the second magnetic structure 802 is at is nearest position to the magnets 400 and/or 401).

In the examples of FIGS. 6-8, the magnetic structures that reduce the stiffness of the speaker 114 are formed from magnetic (e.g., ferromagnetic) material that is attached to the voice coil former 500. In one or more other implementations, some or all of the magnetic structures (e.g., some or all of the first magnetic structure 600, the second magnetic structure 602, the third magnetic structure 700, the first magnetic structure 800, and/or the second magnetic structure 802) may be formed as an integral part of the voice coil former 500 (e.g., some portions of the voice coil former 500, at or near the locations described in connection with the magnetic structures of FIGS. 6-8) may be formed from a magnetic material, such as steel.

In one or more implementations, one or more sections of the voice coil 402 itself may be formed from a magnetic material. For example, some portions of the voice coil 402, at or near the locations described in connection with the first magnetic structure 600, the second magnetic structure 602, the third magnetic structure 700, the first magnetic structure 800, and/or the second magnetic structure 802 of FIGS. 6-8, may be formed from a magnetic material, such as steel. For example, FIG. 9 illustrates a cross-sectional view of a portion of the speaker 114 in an implementation in which some of the windings 502 of the voice coil 402 are formed from a magnetic material, such as steel.

Figure 9:
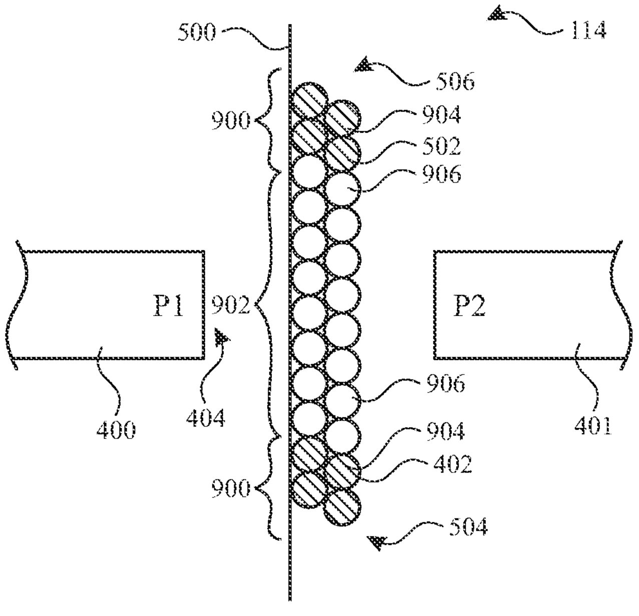
FIG. 9 illustrates a cross-sectional side view of a portion of a speaker in an implementation that includes magnetic structures formed as part of a voice coil in accordance with various aspects of the subject technology.

As shown in FIG. 9, in one or more implementations, the windings 502 of the voice coil 402 may include a first set 900 of windings 904 that is formed from a conductive magnetic material (e.g., steel), and a second set 902 of windings 906 that is formed from a conductive non-magnetic material (e.g., copper). In one or more implementations, the first set 900 of the windings 904 may form a contiguous conductive path with the second set 902 of the windings 906. For example, each of the two ends of a non-magnetic wire (e.g., a copper wire) that forms the windings 906 may be spliced together with, or otherwise connected to, an end of a magnetic (e.g., steel) wire that forms the windings 904. In this way, the voice coil 402 may be a contiguous coil including magnetic and non-magnetic sections that both carry the current that is provided to drive the motion of the voice coil 402 and thus the diaphragm 301. In one or more other implementations, the magnetic windings 904 may be inactive windings of a magnetic wire that do not receive any current therethrough. In one or more other implementations, the magnetic windings 904 may be active windings of a magnetic wire that are separate from, and that receive a different current from, the current that is provided through the non-magnetic windings 906.

In the example of FIG. 8, the magnetic windings 904 are located at first and second respective ends of the voice coil 402. In this way, the magnetic windings can be sized and positioned to form a bi-stable magnetic system (e.g., as in the example of FIG. 6). In one or more other implementations, the locations of the magnetic windings 904 may cause the magnetic windings 904 to form a tri-stable magnetic system (e.g., as in the example of FIG. 7 or FIG. 8). For example, in one or more implementations, one or more additional magnetic windings 904 may be provided at one or more additional locations within the voice coil 402 (e.g., at or near a center of the voice coil, to provide a tri-stable system, as in the example of FIG. 7).

In the examples of FIGS. 6-9, an audio transducer, such as a speaker, is provided with magnetic structures on, near, or within a voice coil, the magnetic structures being formed from magnetically susceptible material (e.g., ferromagnetic material) that is attracted to one or more magnets (e.g., magnets 400 and/or 401, also formed from a magnetic material and having been magnetized to have a north and a sound pole and to generate a magnetic field in the space around the magnet). In the examples of FIGS. 6-9, the magnetic structures are unmagnetized, and may not generate a magnetic field of their own. However, in one or more implementations, an audio transducer, such as a speaker, may include one or more fixed magnets and one or more movable magnets that interact with the fixed magnet(s) to reduce the effective stiffness by which the diaphragm of the speaker is movably mounted. For example, FIGS. 10A and 10B illustrate example implementations of the speaker 114 in which one or more fixed magnets and one or more movable magnets interact to reduce the effective stiffness by which the diaphragm of the speaker is movably mounted.

Figure 10A:
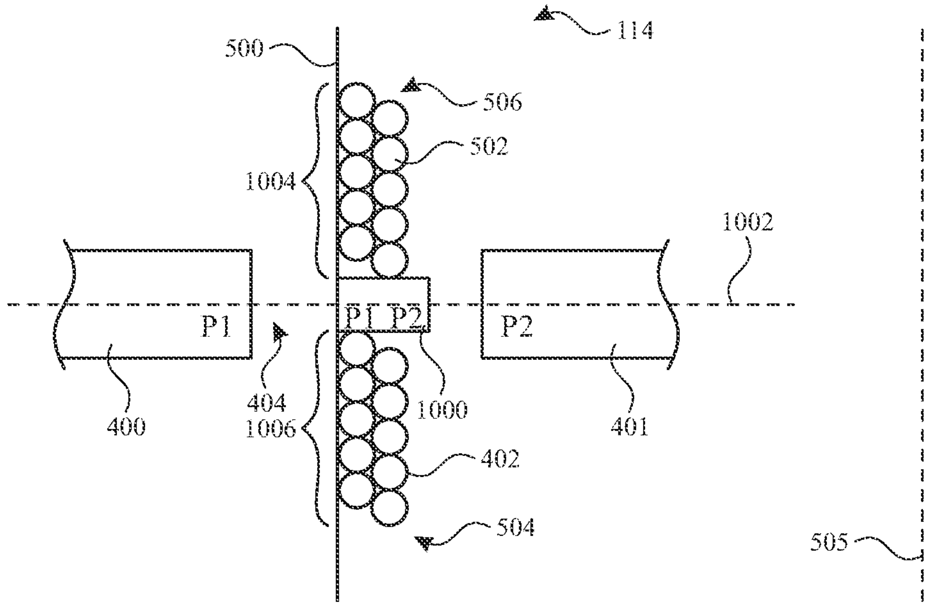
FIG. 10A illustrates a cross-sectional side view of a portion of a speaker in an implementation that includes a voice coil and a magnet coupled thereto for stiffness reduction in accordance with various aspects of the subject technology.
Figure 10B:
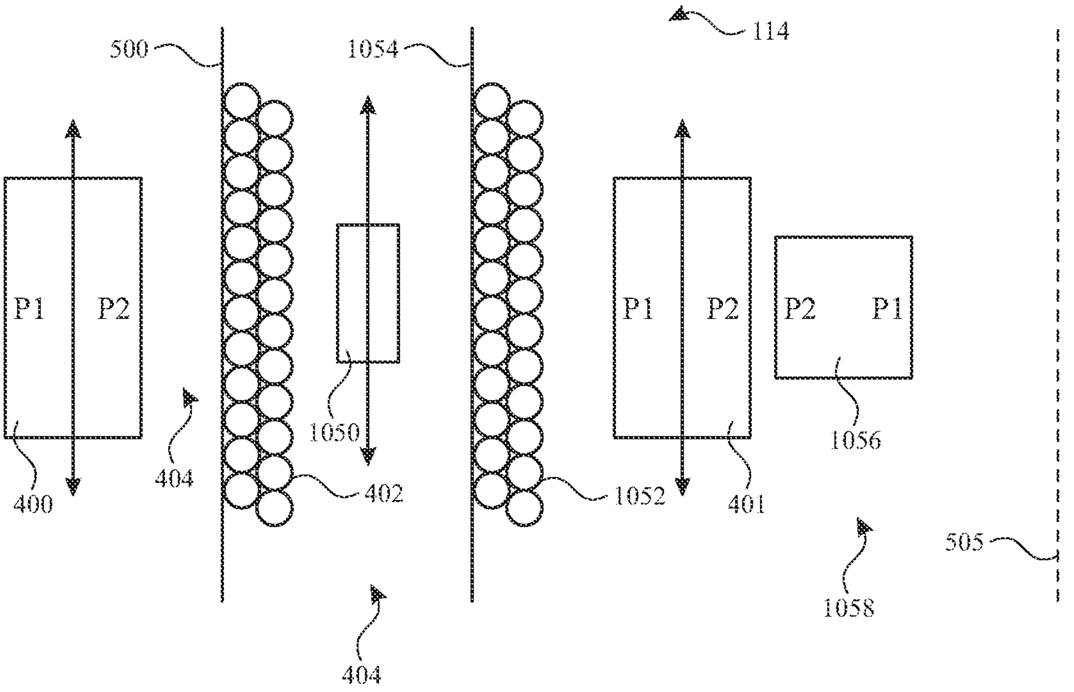
FIG. 10B illustrates a cross-sectional side view of a portion of a speaker in another implementation that includes a magnet for stiffness reduction in accordance with various aspects of the subject technology.

For example, FIG. 10A illustrates a cross-sectional view of the portion of the speaker 114 depicted within the dot-dashed box of FIG. 5A or 5B, in which the speaker 114 includes a magnet 1000 (e.g., a second magnet in addition to a first magnet, such as the magnet 400 or the magnet 401). As shown, the magnet 400 may include a first pole, P1, that faces a first side the voice coil 402, and the magnet 401 (e.g., a separate magnet or a portion of the magnet 400) may include a second pole, P2, opposite to the first pole, P1, that faces an opposing second side of the voice coil 402. (e.g., as in FIGS. 6-9). In the example of FIG. 10A, the speaker 114 includes a magnet 1000 disposed between two portions 1004 and 1006 of the voice coil 402 (e.g., between two sets of the windings 502 of the voice coil 402). As shown in FIG. 10A, the voice coil 402 and the magnet 1000 may be mounted to the voice coil former 500. For example, the magnet 1000 may be disposed at a center of the voice coil former 500 between two substantially equal portions 1004 and 1006 of the voice coil 402. In one or more implementations (e.g., as in the implementation of FIG. 5A), the magnet 1000 may be a movable magnet that is configured to move with the voice coil 402, and to repel the magnet 400 and the magnet 401, implemented as fixed magnets. In one or more implementations (e.g., as in the implementation of FIG. 5B), the magnet 1000 may be a fixed magnet that is fixed in position with the voice coil 402, and configured to repel the magnet 400 and the magnet 401 with varying degrees of force as the magnet 400 and the magnet 401 move relative to the fixed voice coil and the magnet 1000.

For example, as shown in FIG. 10A, the magnet 1000 may include a first pole, P1, that faces the first pole, P1, of the magnet 400 and a second pole, P2, that faces the second pole, P2, of the magnet 401. For example, the poles P1 may be north poles and the poles P2 may be south poles, in one or more implementations. As another example, the poles P1 may be south poles and the poles P2 may be north poles, in one or more other implementations.

For example, as shown in FIG. 10A, in one or more implementations, the voice coil 402 and the magnet 1000 are movable along a first dimension (e.g., a dimension parallel to the axis 505 of the speaker 114) within a gap 404 between a north pole (e.g., P1) and a south pole (e.g., P2) of the magnets 400 and/or 401, and the magnet 1000 has a south pole (e.g., P2) and a north pole (e.g., P1) aligned along a second dimension 1002 that is substantially perpendicular to the first dimension. As shown, the north pole (e.g., P1) of the magnet 1000 may be arranged in opposition to (e.g., facing) the north pole (e.g., P1) of the magnet 400, and the south pole (e.g., P2) of the magnet 1000 may be arranged in opposition to (e.g., facing) the south pole (e.g., P2) of the magnet 401, to provide a repelling force between the magnet

1000 and the magnets 400 and/or 401. In this way, when, for example, the current passing through the voice coil 402 moves the voice coil 402 and the magnet 1000 away from the center position shown in FIG. 10A in either direction along the dimension parallel to the axis 505, the repelling force between the magnet 1000 and the magnets 400 and/or 401 may assist in the motion of the voice coil 402 (and thus the diaphragm 301 coupled thereto), and reduce the stiffness of the speaker in this way.

The configuration of FIG. 10A, in which the speaker 114 includes a magnet 1000 that repels the magnet(s) 400 and/or 401, can also be beneficial in providing a centering force for the voice coil 402 and/or the magnets 400 and/or 401 along the dimension 1002. By repelling both the magnet 400 on one side of the voice coil, and (e.g., equally) repelling the magnet 401 on the other side of the voice coil, the magnet 1000 may cause the voice coil 402 to be centered within the gap 404, and help to prevent contact between the voice coil 402 and the magnets 400 and/or 401.

In the example of FIG. 10A, the magnet 1000 that repels the magnets 400 and 401 may be implemented a movable magnet that is disposed in the gap 404 in the magnets within which the voice coil 402 is disposed (e.g., a main voice coil gap) and that is mounted to the voice coil former 500 for movement, parallel to the axis 505, with the voice coil 402. FIG. 10B illustrates another example implementation in which a magnet is provided to reduce the stiffness of the speaker 114 by repelling one or more of the magnets 400 and/or 401.

In the example of FIG. 10B, the magnets 400 and 401 may be movable magnets (e.g., as indicated by the double-sided arrows in the figure) that are disposed on opposing sides of the gap 404 therebetween. For example, the voice coil 402 may be implemented as a fixed voice coil (e.g., acting as a fixed stator of, for example, a reluctance motor implementation of speaker circuitry of the speaker 114), and the magnets 400 and 401 may be movably suspended with respect to the fixed voice coil. In this configuration, the magnet 400 is disposed on a first side of the voice coil 402, and the magnet 401 is disposed on a second side of the voice coil 402. In this example, as in the example of FIG. 5B, a sound-generating component 215, such as the diaphragm 301, may be mechanically coupled to the magnet 400 and/or the magnet 401. In the example of FIG. 10B, the speaker 114 also includes an additional fixed voice coil 1052 (e.g., formed on an additional fixed voice coil former 1054) between the magnet 400 and the magnet 401. In one or more implementations, a third movable magnet 1050 (e.g., mechanically coupled to the diaphragm 301 and configured to move with the magnets 400 and/or 401) may be disposed between the fixed voice coil (e.g., voice coil 402 in this implementation) and the additional fixed voice coil 1052.

In the example of FIG. 10B, the speaker 114 also includes a fixed magnet 1056. For example, the fixed magnet 1056 may be disposed in an additional gap 1058 in the movable magnets of the speaker 114. As shown, the magnet 401 (e.g., a second movable magnet on a second side of the voice coil) may be disposed between the fixed magnet 1056 and the additional fixed voice coil 1052 (and/or between the fixed magnet 1056 and the voice coil 402). As shown, the fixed magnet 1056 may have a first pole (e.g., P2, such as a south pole), that faces a corresponding pole (e.g., a same pole, P2, such as a south pole) of the magnet 401. In this way, the fixed magnet 1056 may be configured to repel at least the magnet 401 with increasing and decreasing force as the magnet 401 moves (e.g., parallel to the axis 505) toward and away from the fixed magnet 1056. In this way, the repelling force of the fixed magnet 1056 and the magnet 401 (e.g., a moving magnet in this implementation) may assist in the motion of the magnets 400, 401, and/or 1050, and thereby effectively reduce the stiffness of the speaker 114.

In one or more variations of the implementation of FIG. 10B, any, none, or all of the magnetic structures described in connection with FIGS. 6-10A may also be included in the speaker 114 having the fixed magnet 1056 (e.g., with one or more of the magnetic structures fixed in position with the fixed voice coil).

In the examples of FIGS. 5-10B, magnets 400 and 401 are separated by a gap 404 that extends between the magnets 400 and 401 along a direction that is substantially parallel to the axis 505 of the speaker 114. In one or more implementations, other configurations of the magnets can be used with the voice coil 402 and the magnetic structures of any of FIGS. 6-10.

Figure 11:
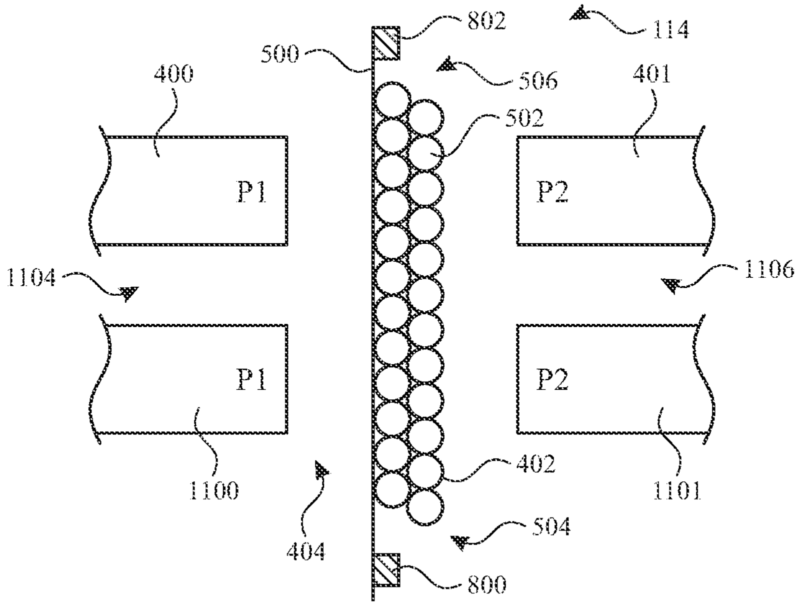
FIG. 11 illustrates a cross-sectional side view of a portion of a speaker in an implementation that includes a voice coil, magnetic structures, and a magnet having a gap in accordance with various aspects of the subject technology.

For example, as shown in FIG. 11, the magnets of the speaker 114 may include a pair of magnet portions on each side of the voice coil. As shown, the speaker 114 may include the magnet 400 and a magnet 1100, having the same magnetic polarity (e.g., P1) separated by a gap 1104 on a first side of the voice coil 402 (e.g., on an external side of the voice coil 402), and the magnet 401 and a magnet 1101, having the same magnetic polarity (e.g., P2) may be separated by a gap 1106 on a second side of the voice coil 402 (e.g., on an internal side of the voice coil 402, such as within a cylindrical bore formed by the windings of the voice coil). As shown, the magnet 1100 and the magnet 1101 may be separated by the gap 404, within which the voice coil 402 is disposed and actuates.

In various implementations, the magnet 1100 and the magnet 1101 may be separate magnets or may be portions (e.g., opposite poles) of a single magnet having an opening corresponding to the gap 404. In various implementations, the magnet 400 and the magnet 1100 may be separate magnets or may be portions of a single magnet having an opening corresponding to the gap 1104. In various implementations, the magnet 401 and the magnet 1101 may be separate magnets or may be portions of a single magnet having an opening corresponding to the gap 1106.

In the example of FIG. 11, the magnetic structures of the speaker 114 that provide stiffness reduction for the speaker 114 are the first magnetic structure 800 and the second magnetic structure 802 of FIG. 8. However, this is merely illustrative and, in various other implementations, the magnets 400, 401, 1100, and 1101 of FIG. 1 can be used with any or all of the magnetic structures of any or all of FIGS. 6-10 (e.g., any or all of the first magnetic structure 600, the second magnetic structure 602, the third magnetic structure 700, the first magnetic structure 800, the second magnetic structure 802, the magnetic windings 904, and/or the magnet 1000).

In the examples of FIGS. 6-10, the magnetic structures of the speaker 114 that provide stiffness reduction for the speaker 114 are depicted and described as being formed on (e.g., attached to) the voice coil former 500 within the gap 404 in the magnets 400 and 401. However, it is also appreciated that, in one or more other implementations, the voice coil 402 and/or the voice coil former 500 may be free of magnetic structures, and/or one or more of the magnetic structures of FIGS. 6-10 (e.g., any or all of the first magnetic structure 600, the second magnetic structure 602, the third magnetic structure 700, the first magnetic structure 800, the second magnetic structure 802, the magnetic windings 904, and/or the magnet 1000) and/or one or more additional magnetic structures, may be formed on one or more separate formers that are disposed in one or more additional gaps (e.g., one or more additional gaps aligned with the axis 505) in the fixed magnets (e.g., and that are mechanically coupled to the voice coil 402 and/or the diaphragm 301).

It is also appreciated that, in the examples of FIGS. 6-10, the first magnetic structure 600, the second magnetic structure 602, and the third magnetic structure 700, are provided without the first magnetic structure 800, the second magnetic structure 802, or the magnetic windings 904. However, in one or more other implementations, two or more or all of the magnetic structures of FIGS. 6-10 (e.g., two or more or all of the first magnetic structure 600, the second magnetic structure 602, the third magnetic structure 700, the first magnetic structure 800, the second magnetic structure 802, the magnetic windings 904, and/or the magnet 1000) can be used together in an audio transducer, such as the speaker 114.

Figure 12:
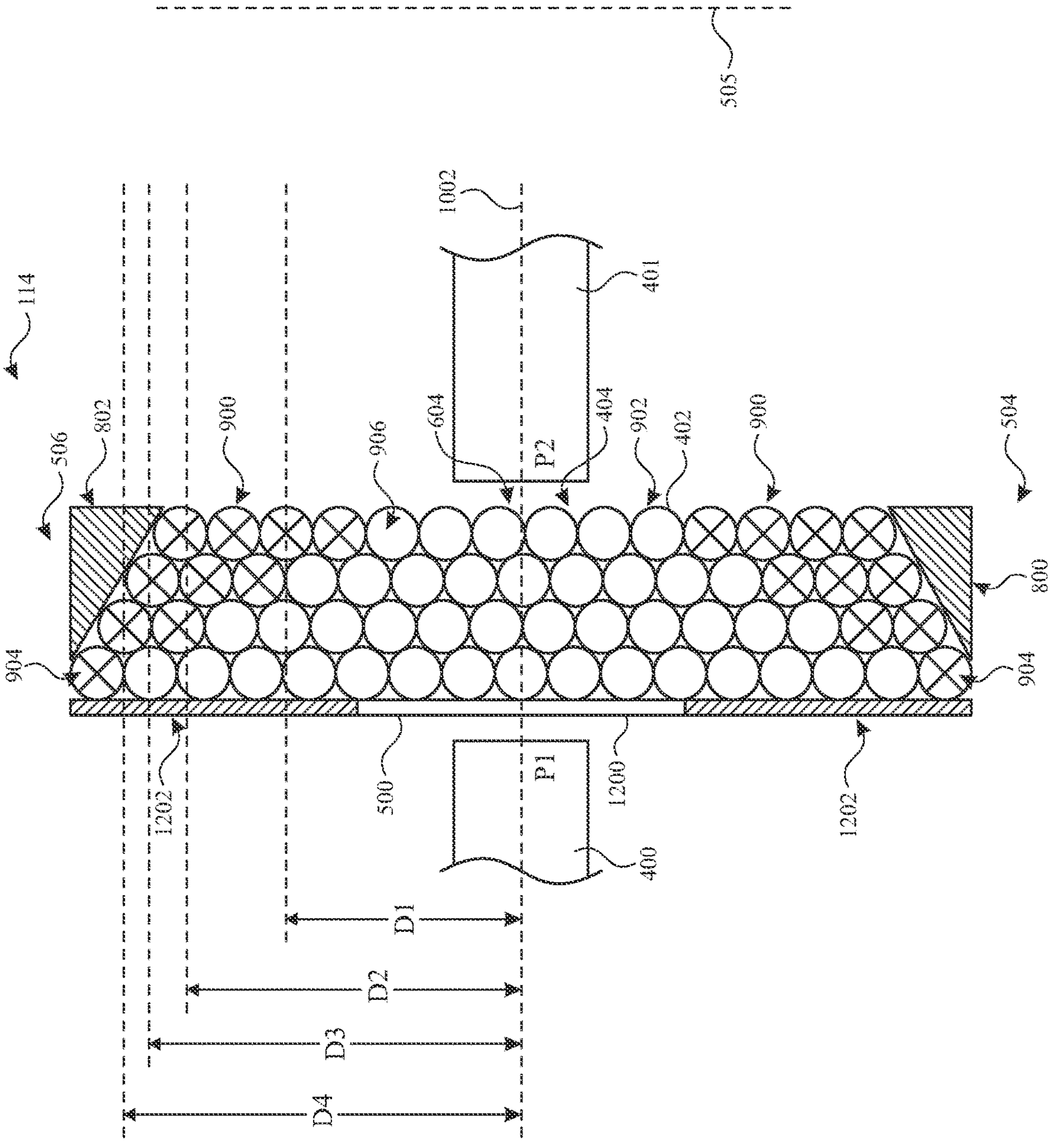
FIG. 12 illustrates a cross-sectional side view of a portion of a speaker in an implementation that includes a voice coil and multiple types of magnetic structures in accordance with various aspects of the subject technology.

For example, FIG. 12 illustrates an example implementation in which the speaker 114 includes the first magnetic structure 800 and the second magnetic structure 802 at opposing ends of the voice coil 402, and includes a first set 900 of windings 904 that is formed from a conductive magnetic material (e.g., steel), and a second set 902 of windings 906 that is formed from a conductive non-magnetic material (e.g., copper). In this example, the speaker 114 also includes a voice coil former 500 that includes a non-magnetic portion 1200 and one or more magnetic portions 1202. As shown, the one or more magnetic portions 1202 may include first and second magnetic portions 1202, and the non-magnetic portion 1200 may be disposed between the first and second magnetic portions 1202. For example, the non-magnetic portion 1200 may be formed from a non-magnetic insulating material, and the magnetic portions 1202 may be formed from a ferromagnetic material, such steel, iron, cobalt, nickel, other magnetic materials, and/or combinations and/or alloys thereof. As shown, portions of the voice coil 402 may be formed on (e.g., mounted to) both the magnetic portions 1202 and the non-magnetic portion(s) 1200 of the voice coil former 500.

In one or more implementations, the first set 900 of windings 906 that are formed from the non-magnetic material may form a contiguous conductive pathway with the second set 902 of windings 904 formed from the magnetic material. For example, the contiguous conductive pathway may be used to provide a current through the windings 904 and the windings 906, to actuate the voice coil 402 (or the magnets 400 and 401 relative to the voice coil 402), and resultingly the diaphragm 301, to generate sound. In one or more other implementations, the first set 900 of windings 906 that are formed from the non-magnetic material may form a separate conductive pathway with the second set 902 of windings 904 formed from the magnetic material. In these implementations, the windings 904 may carry a different current from the windings 906, or the windings 904 may not be used to carry a current.

In the example of FIG. 12, an audio transducer (e.g., speaker 114) is shown that includes a first magnet (e.g., magnet 400 and/or magnet 401); a voice coil 402; and a sound-generating component (e.g., diaphragm 301, attached to the voice coil former 500 as shown in, for example, FIG. 5A or to the magnet 400 and/or the magnet 401 as shown in FIG. 5B) that is mechanically coupled to one of the voice coil 402 and the first magnet, and that is movably suspended with respect to the other of the voice coil or the first magnet, in which the voice coil 402 includes a first plurality of windings 906 formed from a non-magnetic material and a second plurality of windings 904 formed from a magnetic material. As discussed herein in connection with, for example, FIGS. 2-5, the audio transducer may also include a sealed back volume 211 filled with air that generates a stiffness that resists motion of the sound-generating component (e.g., and the voice coil). In the example of FIG. 12, the second plurality of windings 904 formed from the magnetic material are configured to magnetically interact with the first magnet (e.g., magnet 400 and/or magnet 401) to provide a negative stiffness that effectively cancels at least some of the stiffness generated by the air in the sealed back volume 211. In the example of FIG. 12, the audio transducer also includes a first magnetic ring (e.g., first magnetic structure 800) at a first end 504 of the voice coil 402 and a second magnetic ring (e.g., second magnetic structure 802) at an opposing second end 506 of the voice coil 402. In one or more other implementation, the first and/or second magnetic structures 800 and/or 802 as shown in FIG. 12 may be implemented as multiple (e.g., non-continuous) ring segments and/or c-shaped magnetic structure (e.g., to counter magnetic hysteresis effects).

FIG. 12 also illustrates how one or more or all of the magnetic structures that provide stiffness reduction for the speaker 114 can be configured (e.g., sized, shaped, and/or positioned) to provide a progressively changing magnetic interaction with a progressively changing distance from the centered position of the voice coil 402 and/or from the magnet(s) 400 and/or 401. For example, in the example of FIG. 12, the first magnetic structure 800 and the second magnetic structure 802 have a triangular cross-section, with a radial width that increases with an increasing distance from the center 604 of the voice coil 402. In the example of FIG. 12, the voice coil 402 also includes differing numbers of windings 904 of magnetic material at differing distances from the center 604 of the voice coil 402. Providing different widths of magnetic structures from the center 604, and/or different numbers of windings at particular distances from the center 604 may cause the magnetic structures and/or windings to experience a progressively changing force with progressively changing distance from the magnet(s) 400 and/or 401, as the voice coil 402 moves in the gap 404 or as the magnets move relative to the voice coil 402 in the gap 404.

This progressive force may help to reduce or prevent distortion in the sound from the speaker 114 that could otherwise be caused by the magnetic interaction of the magnetic structures and/or windings. In one or more implementations, the speaker 114 in the example of FIG. 12 (and/or any of the examples of FIGS. 6-11) may be operated using an additional linearization operation (e.g., controlled by the current through the voice coil 402 and/or one or more additional linearizing components). In one or more implementations, the magnetic portions 1202 of the voice coil former 500, the windings 904, and/or the first and/or second magnetic structures 800 and/or 802 may advantageously be configured (e.g., sized, shaped, and/or positioned) to focus the flux from the magnet system, offsetting the reception in the windings 906 (e.g., copper and/or other non-ferromagnetic turns) for a given magnet geometry.

As shown in FIG. 12, in one or more implementations, the first magnetic structure 800 and/or the second magnetic structure 802 may be radially tapered structures. In one or more implementations, some portions of the first magnetic structure 800 and/or the second magnetic structure 802 may be axially tapered. In the example of FIG. 12, the first magnetic structure 800 and/or the second magnetic structure 802 each have a shape configured to progressively interact with the first magnet (e.g., magnet 400 and/or magnet 401)

in response to a progressively changing distance from the first magnet (e.g., magnet 400 and/or magnet 401). For example, as shown in FIG. 12, the voice coil 402 extends from a first end 504 through a center 604 to a second end 506, and the set 900 of windings 904 formed from the magnetic material include a first number of windings (e.g., one) at a first distance (e.g., D1) from the center 604 of the voice coil and a second number of windings (e.g., two, three, or more than three), different from the first number of windings, at a second distance (e.g., D2) from the center 604 of the voice coil. In this way, the first number of windings and the second number of windings may be configured to progressively interact with the magnet responsive to a progressively changing distance from the magnet (e.g., as the voice coil 402, and resultingly the magnetic windings, move due to a current passing through the voice coil, in some implementations).

As shown in the example of FIG. 12, each of the first magnetic structure 800 and the second magnetic structure 802 is tapered such that the magnetic structure has a first width (e.g., a first radial width), in a direction (e.g., a radial direction) orthogonal to a line extending from the first end of the voice coil to the opposing second end of the voice coil, at a first distance (e.g., D3) from the center 604 of the voice coil 402, and has a second width, in the direction orthogonal to the line extending from the first end 504 of the voice coil 402 to the opposing second end 506 of the voice coil 402, at a second distance (e.g., D4) from the center 604 of the voice coil 402. As shown, the first width may be different from (e.g., greater than) the second width. In this way, the first width and the second width of each of the first magnetic structure 800 and/or the second magnetic structure 802 may be configured to progressively interact with the first magnet (e.g., magnet 400 and/or magnet 401) responsive to a progressively changing distance from the first magnet (e.g., as the voice coil 402, and thus the magnetic structures, move due to a current passing therethrough, in some implementations).

Figure 13:
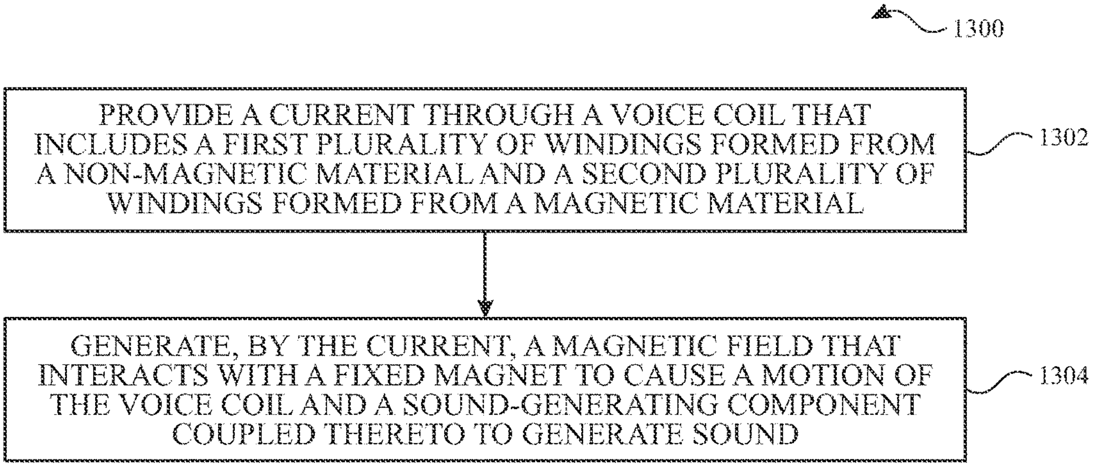
FIG. 13 illustrates a flow chart of illustrative operations that may be performed for operating an audio transducer in accordance with various aspects of the subject technology.

FIG. 13 illustrates a flow diagram of an example process for operating an audio transducer such a speaker, in accordance with one or more implementations. For explanatory purposes, the process 1300 is primarily described herein with reference to the speaker 114 of FIGS. 1-12. However, the process 1300 is not limited to the speaker 114 of FIGS. 1-12, and one or more blocks (or operations) of the process 1300 may be performed by one or more other components and other suitable audio transducers. Further for explanatory purposes, the blocks of the process 1300 are described herein as occurring in serial, or linearly. However, multiple blocks of the process 1300 may occur in parallel. In addition, the blocks of the process 11300 need not be performed in the order shown and/or one or more blocks of the process 1300 need not be performed and/or can be replaced by other operations.

In the example of FIG. 13, at block 1302, an electronic device (e.g., electronic device 100) may provide a current through a voice coil (e.g., voice coil 402) that includes a first plurality (e.g., set 902) of windings (e.g., windings 906) formed from a non-magnetic material and a second plurality (e.g., set 900) of windings (e.g., windings 904) formed from a magnetic material. For example, the current may be generated by speaker circuitry (e.g., speaker circuitry 222) of a speaker (e.g., speaker 114), and/or by device circuitry (e.g., device circuitry 224) of a device (e.g., electronic device 100) within which the speaker is disposed.

At block 1304, the current may generate a magnetic field that interacts with a magnet (e.g., magnet 400 and/or magnet 401) to cause a motion between the voice coil 402 and the magnet, to move a sound-generating component (e.g., a sound-generating component 215, such a diaphragm 301) coupled to the voice coil 402 or the magnet to generate sound. In one or more implementations, the second plurality of windings formed from the magnetic material interact magnetically with the magnet to facilitate the motion of the voice coil and the sound-generating component coupled thereto. In one or more implementations, one or more additional magnetic structures (e.g., any or all of the first magnetic structure 600, the second magnetic structure 602, the third magnetic structure 700, the first magnetic structure 800, the second magnetic structure 802, the magnetic windings 904, and/or the magnet 1000) of the audio transducer may also interact magnetically with the magnet to facilitate the motion of the voice coil and the sound-generating component coupled thereto. In one or more implementations, the second plurality of windings formed from the magnetic material interact magnetically with the magnet to facilitate motion of the magnet relative to the voice coil, and to thereby facility motion of the sound-generating component coupled to the magnet.

Figure 14:
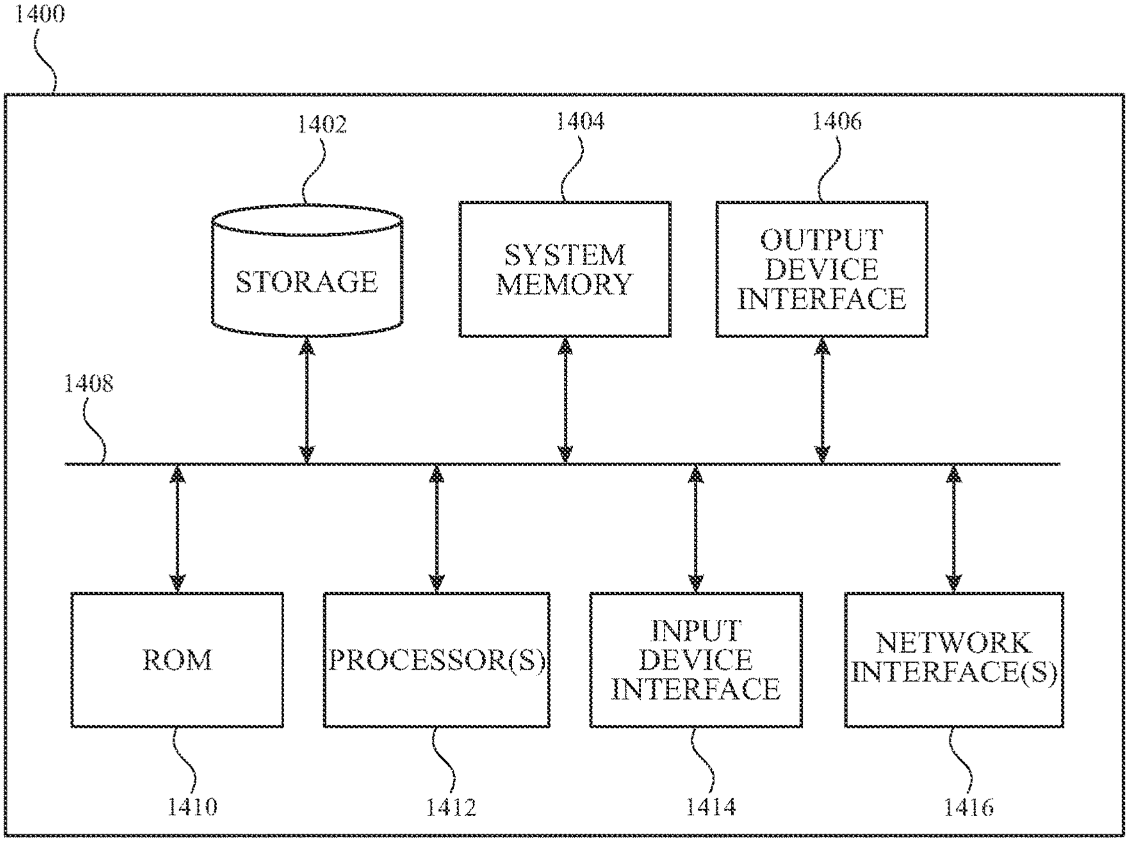
FIG. 14 illustrates an electronic system with which one or more implementations of the subject technology may be implemented.

FIG. 14 illustrates an electronic system 1400 with which one or more implementations of the subject technology may be implemented. The electronic system 1400 can be, and/or can be a part of, one or more of the electronic device 100 shown in FIG. 1. The electronic system 1400 may include various types of computer readable media and interfaces for various other types of computer readable media. The electronic system 1400 includes a bus 1408, one or more processing unit(s) 1412, a system memory 1404 (and/or buffer), a ROM 1410, a permanent storage device 1402, an input device interface 1414, an output device interface 1406, and one or more network interfaces 1416, or subsets and variations thereof.

The bus 1408 collectively represents all system, peripheral, and chipset buses that communicatively connect the numerous internal devices of the electronic system 1400. In one or more implementations, the bus 1408 communicatively connects the one or more processing unit(s) 1412 with the ROM 1410, the system memory 1404, and the permanent storage device 1402. From these various memory units, the one or more processing unit(s) 1412 retrieves instructions to execute and data to process in order to execute the processes of the subject disclosure. The one or more processing unit(s) 1412 can be a single processor or a multi-core processor in different implementations.

The ROM 1410 stores static data and instructions that are needed by the one or more processing unit(s) 1412 and other modules of the electronic system 1400. The permanent storage device 1402, on the other hand, may be a read-and-write memory device. The permanent storage device 1402 may be a non-volatile memory unit that stores instructions and data even when the electronic system 1400 is off. In one or more implementations, a mass-storage device (such as a magnetic or optical disk and its corresponding disk drive) may be used as the permanent storage device 1402.

In one or more implementations, a removable storage device (such as a floppy disk, flash drive, and its corresponding disk drive) may be used as the permanent storage device 1402. Like the permanent storage device 1402, the system memory 1404 may be a read-and-write memory device. However, unlike the permanent storage device 1402, the system memory 1404 may be a volatile read-and-write memory, such as random access memory. The system memory 1404 may store any of the instructions and data that one or more processing unit(s) 1412 may need at runtime. In one or more implementations, the processes of the subject disclosure are stored in the system memory 1404, the permanent storage device 1402, and/or the ROM 1410. From these various memory units, the one or more processing unit(s) 1412 retrieves instructions to execute and data to process in order to execute the processes of one or more implementations.

The bus 1408 also connects to the input and output device interfaces 1414 and 1406. The input device interface 1414 enables a user to communicate information and select commands to the electronic system 1400. Input devices that may be used with the input device interface 1414 may include, for example, microphones, alphanumeric keyboards and pointing devices (also called "cursor control devices"). The output device interface 1406 may enable, for example, the display of images generated by electronic system 1400. Output devices that may be used with the output device interface 1406 may include, for example, printers and display devices, such as a liquid crystal display (LCD), a light emitting diode (LED) display, an organic light emitting diode (OLED) display, a flexible display, a flat panel display, a solid state display, a projector, a speaker or speaker module, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 14, the bus 1408 also couples the electronic system 1400 to one or more networks and/or to one or more network nodes through the one or more network interface(s) 1416. In this manner, the electronic system 1400 can be a part of a network of computers (such as a LAN, a wide area network ("WAN"), or an Intranet, or a network of networks, such as the Internet. Any or all components of the electronic system 1400 can be used in conjunction with the subject disclosure.

In accordance with some aspects of the subject disclosure, an electronic device is provided that includes an audio transducer, the audio transducer including: a fixed magnet; a voice coil that is moveably suspended with respect to the fixed magnet; a sound-generating component that is mechanically coupled to the voice coil; and one or more magnetic structures configured to move with the voice coil and to magnetically interact with the fixed magnet to provide a tri-stable positioning of the sound-generating component.

In accordance with other aspects of the subject disclosure, an audio transducer is provided that includes a fixed magnet; a voice coil that is moveably suspended with respect to the fixed magnet; a sound-generating component that is mechanically coupled to the voice coil; and one or more magnetic structures configured to move with the voice coil and to magnetically interact with the fixed magnet to provide a tri-stable positioning of the sound-generating component.

In accordance with other aspects of the subject disclosure, an audio transducer is provided that includes a fixed magnet; a voice coil that is moveably suspended with respect to the fixed magnet; a sound-generating component that is mechanically coupled to the voice coil; and a movable magnet disposed between two portions of the voice coil, the movable magnet configured to move with the voice coil, and configured to repel the fixed magnet.

In accordance with other aspects of the subject disclosure, an audio transducer is provided that includes a fixed magnet; a voice coil that is moveably suspended with respect to the fixed magnet; and a sound-generating component that is mechanically coupled to the voice coil, wherein the voice coil includes a first plurality of windings formed from a non-magnetic material and a second plurality of windings formed from a magnetic material.

In accordance with other aspects of the subject disclosure, a method is provided that includes providing a current through a voice coil that includes a first plurality of windings formed from a non-magnetic material and a second plurality of windings formed from a magnetic material; where the current generates a magnetic field that interacts with a fixed magnet to cause a motion the voice coil and a sound-generating component coupled thereto to generate sound, and where the second plurality of windings formed from the magnetic material interact magnetically with the fixed magnet to facilitate the motion of the voice coil and the sound-generating component coupled thereto.

In accordance with other aspects of the disclosure, an electronic device is provided that includes an audio transducer, the audio transducer including: a first magnet; a voice coil; a sound-generating component that is mechanically coupled to one of the voice coil or the first magnet and that is movably suspended with respect to the other of the voice coil or the first magnet; and one or more magnetic structures mechanically coupled to the voice coil and configured to magnetically interact with the first magnet to provide a tri-stable positioning of the sound-generating component.

In accordance with other aspects of the disclosure, an audio transducer is provided that includes a first magnet; a voice coil; a sound-generating component that is mechanically coupled to one of the voice coil or the first magnet and that is movably suspended with respect to the other of the voice coil or the first magnet; and a second magnet disposed between two portions of the voice coil, in which the second magnet is configured to repel the first magnet.

In accordance with other aspects of the disclosure, an audio transducer is provided that includes a first magnet; a voice coil; and a sound-generating component that is mechanically coupled to one of the voice coil or the first magnet and that is movably suspended with respect to the other of the voice coil or the first magnet, in which the voice coil comprises a first plurality of windings formed from a non-magnetic material and a second plurality of windings formed from a magnetic material.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In one or more implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as ASICs or FPGAs. In one or more implementations, such integrated circuits execute instructions that are stored on the circuit itself.

Various functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "processor", and "memory" all refer to electronic or other technological devices. These terms exclude people or groups of people. For the purposes of the specification, the terms "display" or "displaying" means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some implementations, multiple software aspects of the subject disclosure can be implemented as sub-parts of a larger program while remaining distinct software aspects of the subject disclosure. In some implementations, multiple software aspects can also be implemented as separate programs. Finally, any combination of separate programs that together implement a software aspect described here is within the scope of the subject disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Some of the blocks may be performed simultaneously. For example, in certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

The predicate words "configured to", "operable to", and "programmed to" do not imply any particular tangible or intangible modification of a subject, but, rather, are intended to be used interchangeably. For example, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "example" is used herein to mean "serving as an example or illustration." Any aspect or design described herein as "example" is not necessarily to be construed as preferred or advantageous over other aspects or design.

In one aspect, a term coupled or the like may refer to being directly coupled. In another aspect, a term coupled or the like may refer to being indirectly coupled.

Terms such as top, bottom, front, rear, side, horizontal, vertical, and the like refer to an arbitrary frame of reference, rather than to the ordinary gravitational frame of reference. Thus, such a term may extend upwardly, downwardly, diagonally, or horizontally in a gravitational frame of reference.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f), unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

What is claimed is:

1. An electronic device comprising:

audio transducer, the audio transducer comprising:

a first magnet;

a voice coil;

a sound-generating component that is mechanically coupled to one of the voice coil or the first magnet, and that is movably suspended with respect to the other of the voice coil or the first magnet; and one or more magnetic structures mechanically coupled to the voice coil and configured to magnetically interact with the first magnet to provide a tri-stable positioning of the sound-generating component.

2. The electronic device of claim 1, the audio transducer further comprising a sealed back volume comprising air that generates a stiffness that resists motion of the sound-generating component, and wherein the tri-stable positioning of the sound-generating component provides a negative stiffness that effectively cancels at least some of the stiffness generated by the air in the sealed back volume.

3. The electronic device of claim 1, wherein the one or more magnetic structures comprise a first magnetic structure adjacent to a first end of the voice coil and a second magnetic structure adjacent to a second end of the voice coil.

4. The electronic device of claim 3, wherein the first magnetic structure comprises a first ring of magnetic material attached to a voice coil former at a first location that is adjacent to the first end of the voice coil, and wherein the second magnetic structure comprises a second ring of magnetic material attached to the voice coil former at a second location that is adjacent to the second end of the voice coil.

5. The electronic device of claim 3, wherein the one or more magnetic structures further comprise a third magnetic structure disposed between the first magnetic structure and the second magnetic structure and between first and second portions of the voice coil.

6. The electronic device of claim 5, wherein the third magnetic structure comprises a ring of magnetic material attached to a voice coil former between the first and second portions of the voice coil.

7. The electronic device of claim 1, wherein the one or more magnetic structures comprise one or more sections of the voice coil that are formed from a magnetic material.

8. The electronic device of claim 1, wherein at least one of the one or more magnetic structures comprise a shape configured to progressively interact with the first magnet in response to a progressively changing distance from the first magnet.

9. The electronic device of claim 1, wherein at least one of the one or more magnetic structures comprises a magnetic portion of a voice coil former on which the voice coil is formed.

10. The electronic device of claim 1, wherein the first magnet comprises a pair of magnet portions separated by a gap.

11. The electronic device of claim 1, wherein the first magnet comprises a fixed magnet, wherein the voice coil is movably suspended with respect to the fixed magnet, wherein the sound-generating component is mechanically coupled to the voice coil, and wherein the one or more magnetic structures are configured to move with the voice coil.

12. The electronic device of claim 1, wherein the first magnet comprises a first movable magnet, wherein the voice coil is a fixed voice coil, wherein the first movable magnet is movably suspended with respect to the fixed voice coil, wherein the sound-generating component is mechanically coupled to the first movable magnet, and wherein the one or more magnetic structures are fixed in position with the fixed voice coil.

13. The electronic device of claim 12, wherein the first movable magnet is disposed on a first side of the voice coil, and wherein the audio transducer further comprises a second movable magnet on a second side of the voice coil.

14. The electronic device of claim 13, wherein the audio transducer further comprises:

an additional fixed voice coil between the first movable magnet and the second movable magnet; and a third movable magnet between the fixed voice coil and the additional fixed voice coil.

15. The electronic device of claim 14, further comprising a fixed magnet, wherein the second movable magnet is disposed between the fixed magnet and the additional fixed voice coil.

16. An audio transducer, comprising:

a first magnet;

a voice coil;

a sound-generating component that is mechanically coupled to one of the voice coil or the first magnet, and that is movably suspended with respect to the other of the voice coil or the first magnet; and one or more magnetic structures mechanically coupled to the voice coil and configured to magnetically interact with the first magnet to provide a tri-stable positioning of the sound- generating component.

17. The audio transducer of claim 16, further comprising a sealed back volume comprising air that generates a stiffness that resists motion of the sound-generating component, and wherein the tri-stable positioning of the sound-generating component provides a negative stiffness that effectively cancels at least some of the stiffness generated by the air in the sealed back volume.

18. The audio transducer of claim 16, wherein the one or more magnetic structures comprise a first magnetic structure adjacent to a first end of the voice coil and a second magnetic structure adjacent to a second end of the voice coil.

19. The audio transducer of claim 18, wherein the first magnetic structure comprises a first ring of magnetic material attached to a voice coil former at a first location that is adjacent to the first end of the voice coil, and wherein the second magnetic structure comprises a second ring of magnetic material attached to the voice coil former at a second location that is adjacent to the second end of the voice coil.

20. The audio transducer of claim 18, wherein the one or more magnetic structures further comprise a third magnetic structure disposed between the first magnetic structure and the second magnetic structure and between first and second portions of the voice coil.

21. The audio transducer of claim 20, wherein the third magnetic structure comprises a ring of magnetic material attached to a voice coil former between the first and second portions of the voice coil.

22. The audio transducer of claim 16, wherein the one or more magnetic structures comprise one or more sections of the voice coil that are formed from a magnetic material.

23. The audio transducer of claim 16, wherein at least one of the one or more magnetic structures comprise a shape configured to progressively interact with the first magnet in response to a progressively changing distance from the first magnet.

24. The audio transducer of claim 16, wherein at least one of the one or more magnetic structures comprises a magnetic portion of a voice coil former on which the voice coil is formed.

25. The audio transducer of claim 16, wherein the first magnet comprises a pair of magnet portions separated by a gap.

26. The audio transducer of claim 16, wherein the first magnet comprises a fixed magnet, wherein the voice coil is movably suspended with respect to the fixed magnet, wherein the sound-generating component is mechanically coupled to the voice coil, and wherein the one or more magnetic structures are configured to move with the voice coil.

27. The audio transducer of claim 16, wherein the first magnet comprises a first movable magnet, wherein the voice coil is a fixed voice coil, wherein the first movable magnet is movably suspended with respect to the fixed voice coil, wherein the sound-generating component is mechanically coupled to the first movable magnet, and wherein the one or more magnetic structures are fixed in position with the fixed voice coil.

28. The audio transducer of claim 27, wherein the first movable magnet is disposed on a first side of the voice coil, and wherein the audio transducer further comprises a second movable magnet on a second side of the voice coil.

29. The audio transducer of claim 28, further comprising:

an additional fixed voice coil between the first movable magnet and the second movable magnet; and a third movable magnet between the fixed voice coil and the additional fixed voice coil.

30. The audio transducer of claim 29, further comprising a fixed magnet, wherein the second movable magnet is disposed between the fixed magnet and the additional fixed voice coil.

* * * * *